United States Patent [19]

Balling

[11] Patent Number: 5,517,270
[45] Date of Patent: May 14, 1996

[54] CAMERA WITH BUILT-IN MEANS FOR CLOSING FILM CASSETTE AND TEARING OPEN CAMERA TO REMOVE CLOSED CASSETTE

[75] Inventor: Edward N. Balling, Rochester, N.Y.

[73] Assignee: Eastman Kodak Company, Rochester, N.Y.

[21] Appl. No.: 407,835

[22] Filed: Mar. 21, 1995

[51] Int. Cl.⁶ .................................................. G03B 17/02
[52] U.S. Cl. ............................................................ 354/288
[58] Field of Search ................................... 354/174, 275, 354/277, 281, 288

[56] References Cited

U.S. PATENT DOCUMENTS 4,890,130  12/1989  Takei et al. ............................... 354/288
5,231,438   7/1993  Smart ....................................... 354/281

FOREIGN PATENT DOCUMENTS 6-130557A  5/1994  Japan.
6-130558A  5/1994  Japan.

*Primary Examiner*—Howard B. Blankenship
*Attorney, Agent, or Firm*—Roger A. Fields

[57] ABSTRACT

A camera comprises a cassette-receiving chamber for holding a film cassette provided with a light lock which is to be completely closed before removing the cassette from the chamber, closing apparatus movable to completely close the light lock, and a tear away strip for opening the camera to permit the cassette to be removed the chamber. The tear away strip has a pull tab which can be manually grasped to be moved to begin to open the camera. The closing apparatus has a shield at least partially covering the pull tab to prevent the pull tab from being manually grasped to be moved to begin to open the camera, but is moved to uncover the pull tab sufficiently to permit it to be manually grasped to be moved to begin to open the camera when the closing apparatus is moved to completely close the light lock.

6 Claims, 5 Drawing Sheets

CAMERA WITH BUILT-IN MEANS FOR CLOSING FILM CASSETTE AND TEARING OPEN CAMERA TO REMOVE CLOSED CASSETTE

CROSS-REFERENCE TO RELATED APPLICATION(S)

Reference is made to commonly assigned copending applications: Ser. No. 08/371,336, entitled APPARATUS AND METHOD FOR CLOSING A FILM CASSETTE AND UNLOADING THE CLOSED CASSETTE FROM A CAMERA, filed Jan. 11, 1995 in the names of David C. Smart and Thomas E. Dussinger; Ser. No. 08/407,991, entitled CAMERA WITH BUILT-IN MEANS FOR CLOSING FILM CASSETTE AND EJECTING CLOSED CASSETTE, filed Mar. 21, 1995 in the name of Edward N. Bailing; and Ser. No. 08/407,992, entitled CAMERA WITH FILM SENSOR FOR CLOSING CASSETTE WHEN FILMSTRIP WOUND COMPLETELY INTO CASSETTE, filed Mar. 21, 1995 in the name of Edward N. Bailing.

FIELD OF THE INVENTION

The invention relates generally to the field of photography, and in particular to a camera with a built-in mechanism for closing a light lock of a film cassette inside the camera and tearing open the camera to remove the closed cassette.

BACKGROUND OF THE INVENTION

Film and cameras that are all in one, commonly referred to as single-use or one-time-use cameras, have recently become well known. Typically, the one-time-use camera is a simple point-and-shoot type comprising a plastic, inner, main body part which supports a fixed-focus taking lens, a film metering mechanism with a rotatably supported metering sprocket, a manual film advance thumbwheel, a single-blade shutter, a manual shutter release button, a frame counter for indicating the number of exposures remaining for picture-taking, a direct see-through viewfinder, and possibly an electronic flash unit. Plastic front and rear cover parts often house the main body part between them to complete the camera assembly, and the rear cover part connects to the main body part and/or to the front cover part to make the main body part light-tight. A decorative cardboard outer box contains the camera assembly and has respective openings for the taking lens, the shutter release button, the film advance thumbwheel, the viewfinder, the frame counter, and a flash emission window.

Typically, during original manufacture or recycling (remanufacture) of the one-time-use camera, a conventional light-trapping film cassette with a 35 mm filmstrip having a film leader protruding from the cassette shell, and a film take-up spool to which a leading end of the protruding film leader is attached, are placed in respective chambers in the main body part. The protruding film leader is positioned over the metering sprocket to place one of a longitudinal series of edge perforations in the leader onto one of an annular series of peripheral teeth on the metering sprocket in order to engage the leader to the metering sprocket. Then, the rear cover part is fitted to the main body part to prevent the protruding film leader from becoming separated from the metering sprocket, and as disclosed in prior art U.S. Pat. No. 4,972,649, issued Nov. 27, 1990, an exposed end of the film take-up spool is rotated to factory prewind substantially the entire length of the unexposed filmstrip from the cassette shell onto the take-up spool. Lastly, the outer box is placed on the camera assembly.

After the photographer takes a picture with the one-time-use camera, he or she manually rotates the thumbwheel to rotate a cassette spool inside the cassette shell to rewind the exposed frame into the cassette shell. The rewinding movement of the filmstrip the equivalent of slightly more than one frame width rotates the metering sprocket, which is in engagement with the filmstrip, to decrement the frame counter to its next lower-numbered setting. When the maximum number of exposures available on the filmstrip are exposed and the filmstrip is completely rewound into the cassette shell, the one-time-use camera is given to a photofinisher who tears the outer box off the camera unit, separates the rear cover part from the main body part, and removes the film cassette with the filmstrip from the main body part. Then, he removes the filmstrip from the cassette shell to develop the negatives and make prints for the customer, and he forwards the used camera parts to the manufacturer for recycling.

As contrasted with the conventional light-trapping film cassette, prior art U.S. Pat. No. 5,357,303, issued Oct. 18, 1994, discloses a new-type film cassette having a light lock which is pivoted closed to prevent ambient light from entering the cassette interior and is pivoted open to permit film movement out of and into the cassette interior. An implement or tool is designed to engage the light lock to pivot it open and closed.

Prior art U.S. Pat. No. 5,231,438, issued Jul. 27, 1993, discloses a camera intended for use with the new-type film cassette having a light lock which is pivoted closed to prevent ambient light from entering the cassette interior and is pivoted open to permit film movement out of and into the cassette interior. The camera has a release button which when manually moved in a releasing direction actuates a latching device. The latching device normally secures a door closed over a chamber holding the film cassette. However, when the latching device is actuated, it operates to pivot the light lock closed and to release the door to uncover the chamber.

The Cross-Referenced Application

Cross-referenced application Ser. No. 08/371,336 discloses a camera comprising a cassette-receiving chamber for holding a film cassette provided with a light lock which is pivoted closed before removing the cassette from the chamber. An exterior opening to the chamber is positioned to longitudinally admit an implement into the chamber for rotation to pivot the light lock closed and to further admit the implement into the chamber to push the cassette out of the chamber. A latch securing a lid closed over the chamber is engageable with the light lock to be moved to release the lid when the light lock is pivoted open. The lid, when released, is hingedly supported to allow the cassette to push the lid open as the cassette is pushed out of the chamber.

SUMMARY OF THE INVENTION

A camera comprising a cassette-receiving chamber for holding a film cassette provided with a light lock which is to be completely closed before removing the cassette from the chamber, closing means movable to completely close the light lock, and opening means for opening the camera to permit the cassette to be removed the chamber. is characterized in that:

the opening means has a pull tab which can be manually grasped to be moved to begin to open the camera; and the closing means has a shield at least partially covering the pull tab to prevent the pull tab from being manually grasped to be moved to begin to open the camera, but is moved to uncover the pull tab sufficiently to permit it to be manually grasped to be moved to begin to open the camera when the closing means is moved to completely close the light lock.

More particularly, the opening means includes a tear away strip integral with the pull tab and adapted to be pulled beginning with the pull tab to tear open the camera.

DETAILED DESCRIPTION OF THE INVENTION

Figure 1:
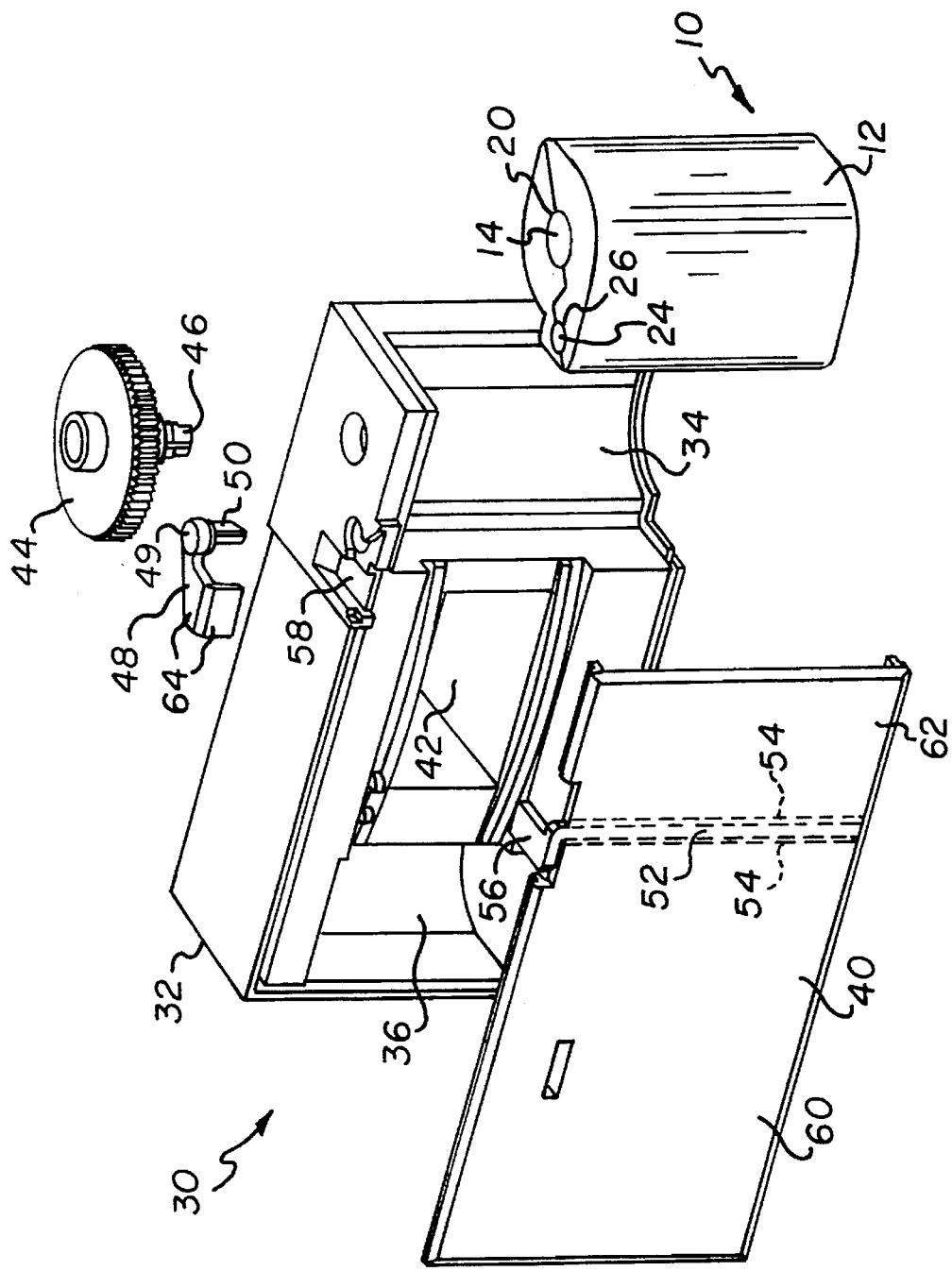
FIG. 1 is an exploded front perspective view of a camera according to a preferred embodiment of the invention and of a film cassette to be loaded into the camera.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1, 3, 4, 5, 7, and 8 show a film cassette 10 similar in operation to ones disclosed in prior art U.S. Pat. No. 5,357,303, issued Oct. 18, 1994, and U.S. Pat. No. 5,231,438, issued Jul. 27, 1993. The film cassette 10 comprises a cassette shell 12 housing a flanged spool 14 on which is stored a wound filmstrip (not shown) provided with an integral film leader (not shown). The cassette spool 14 has opposite exposed ends located in respective end holes 20 in the cassette shell 12 to support the spool for rotation. A light lock 22 has an integral shaft 24 which is supported at opposite exposed ends in respective end holes 26 in the cassette shell 12 to be pivoted open to uncover a film egress/ingress slot 28 in the cassette shell and to be pivoted closed to prevent ambient light from entering the shell interior through the slot.

Figure 2:
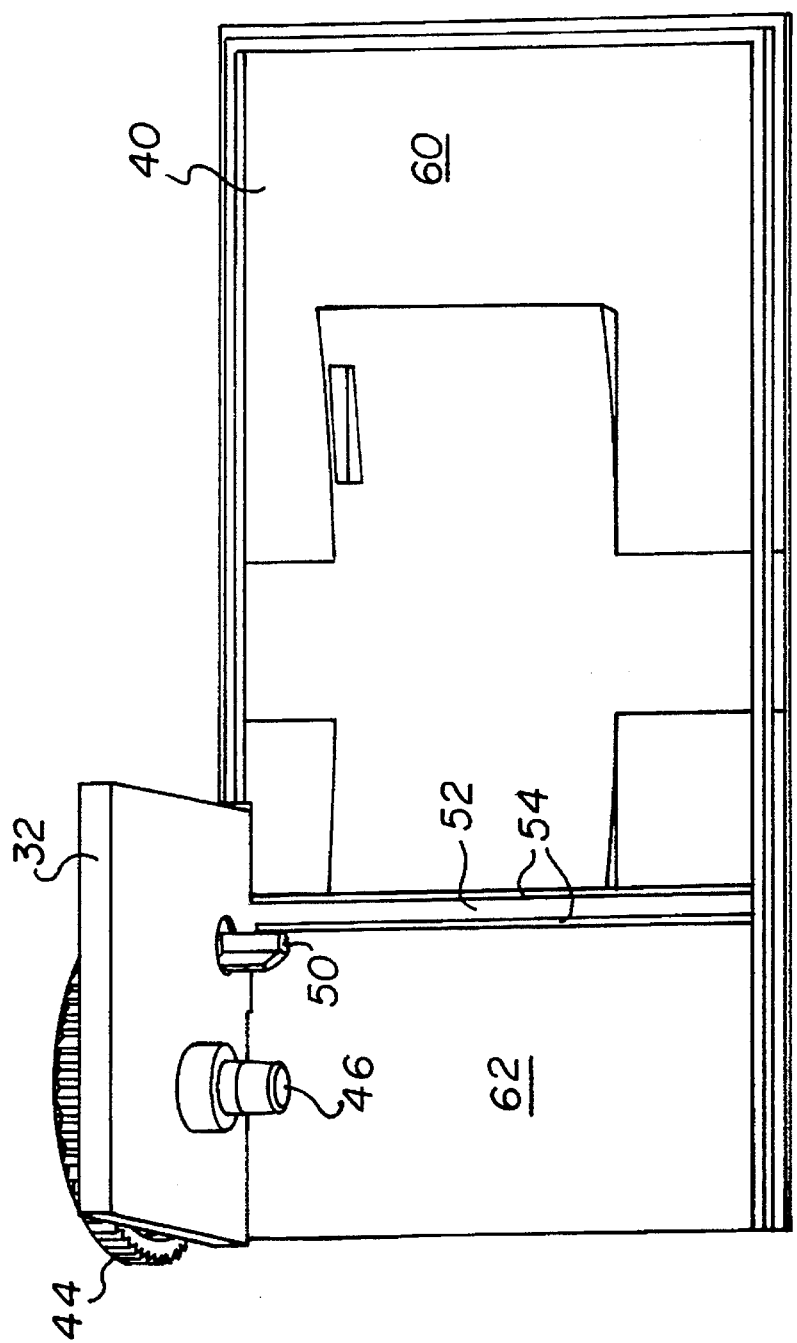
FIG. 2 is a rear perspective view of a rear cover part and a small portion of a main body part of the camera, shown from the inside of the rear cover part.
Figure 3:
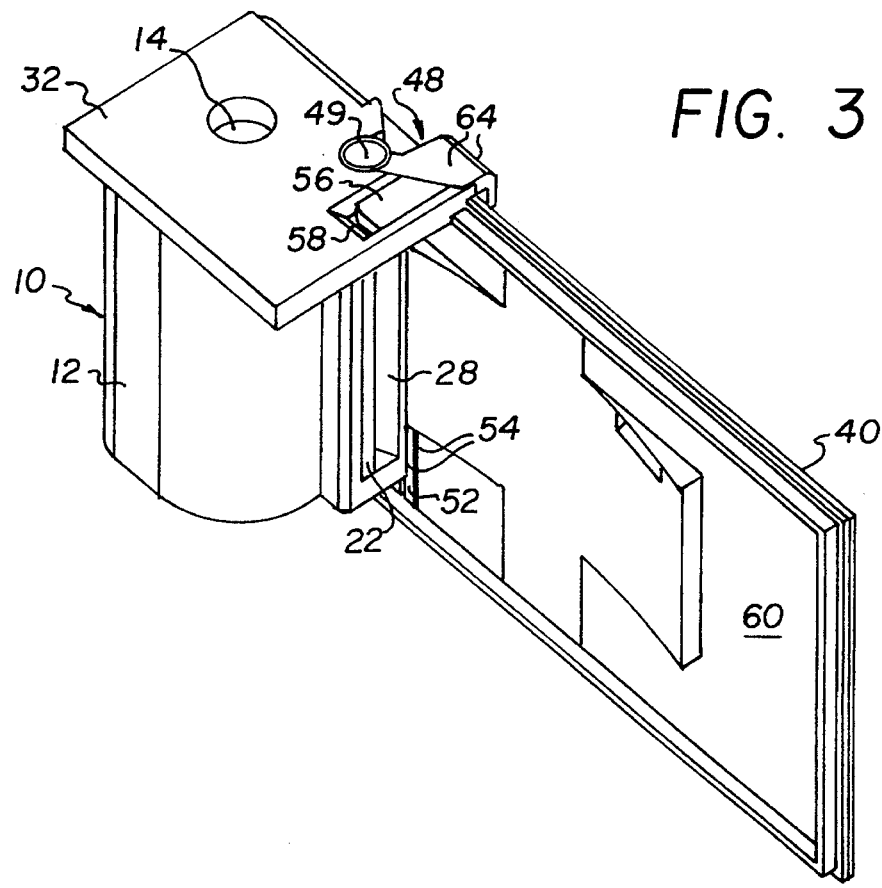
FIG. 3 is a rear perspective view similar to FIG. 2, shown with the film cassette.
Figure 4:
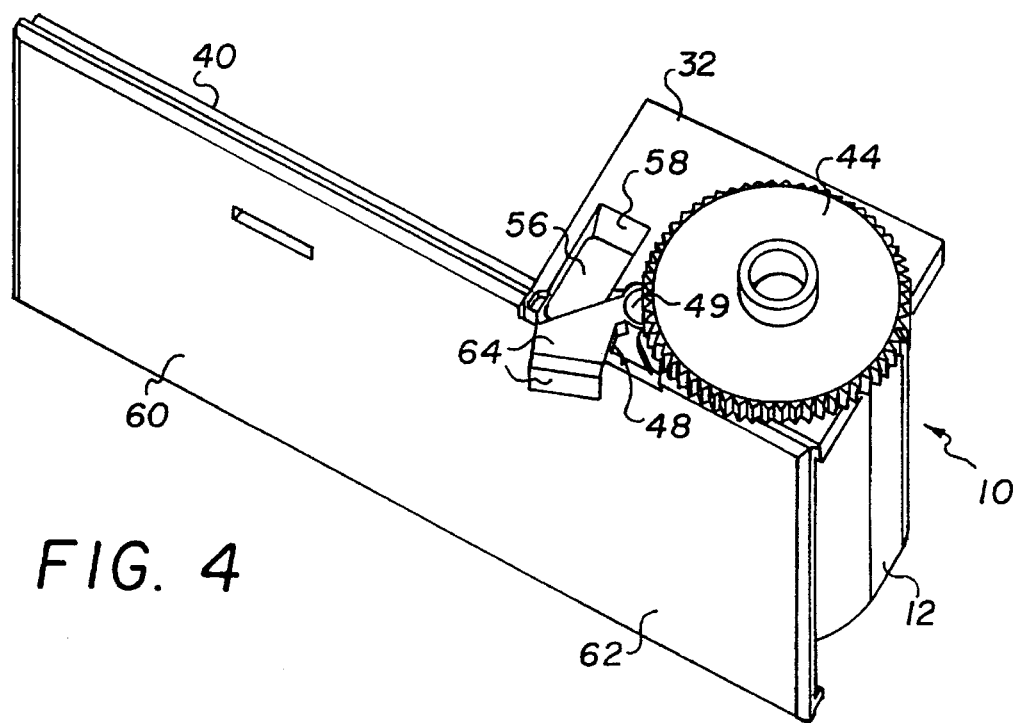
FIG. 4 is a rear perspective view similar to FIG. 3. shown from the outside of the rear cover part.

As shown in FIG. 1, a one-time-use camera 30 with which the film cassette 10 is to be used comprises a main body part 32 that defines a cassette-receiving chamber 34 and a separate unexposed film roll chamber 36, and a front cover part (not shown) and a rear cover part 40 that house the main body part between them to complete the camera assembly. A backframe opening 42 at which successive sections of the filmstrip are to be exposed is located between the cassette-receiving chamber 34 and the unexposed film roll chamber 36. A film advance thumbwheel 44 rotatably supported on the main body part 32 has a depending coaxial projection 46 which protrudes into the cassette-receiving chamber 34 to engage one end of the cassette spool 14 in order to rotate the spool in a winding direction to wind each exposed section of the filmstrip into the cassette shell 12 following its exposure. A manually operated closing lever 48 is pivotally supported on the main body part 32 via an integral pivot disc 49, and it has a depending coaxial projection 50 which protrudes into the cassette-receiving chamber 34 to engage one end of the integral shaft 24 of the light lock 22 in order to pivot the light lock in opposite directions to open and close the film egress/ingress slot 28 in the cassette shell 12. See FIG. 2. The pivot disc 49 is located partially beneath the thumbwheel 44 to make it difficult for one to remove the closing lever 48 from the main body part 32 without breaking something. See FIGS. 7 and 8.

During original manufacture or recycling (remanufacture) of the one-time-use camera 30, the light lock 22 is opened and most of the unexposed filmstrip beginning with its film leader is prewound in the dark from the cassette shell 12 into an unexposed film roll. Then, the film cassette 10 and the unexposed film roll (with a film section extending between the two) are placed in the cassette-receiving and unexposed film roll chambers 34 and 36, and the rear cover part 40 is attached to the main body part 32.

Figure 5:
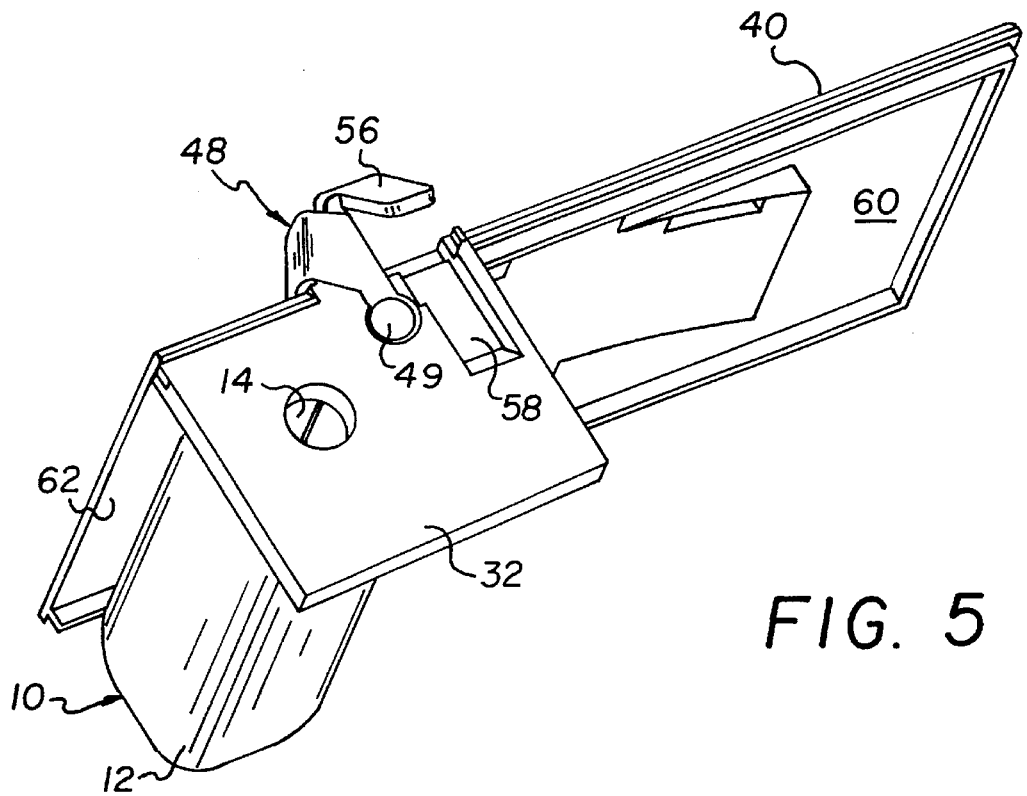
FIGS. 5, 6, 7, and 8 are rear perspective views of the rear cover part and the small portion of the main body part of the camera, showing how a light lock of the film cassette is closed and how the camera is torn open to remove the closed cassette.
Figure 6:
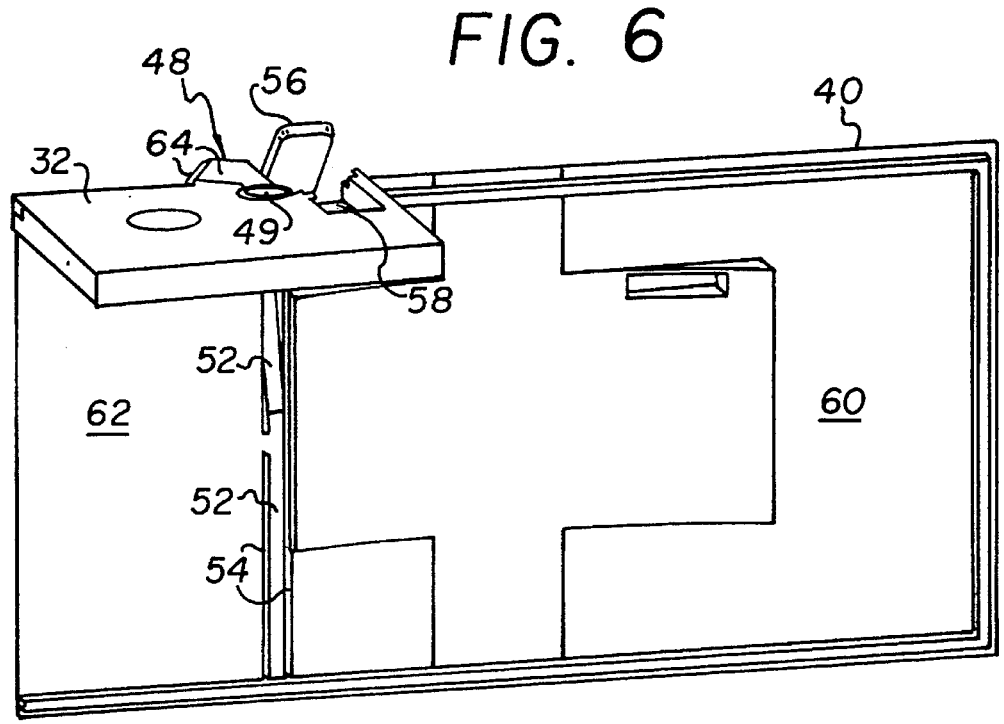
Figure 7:
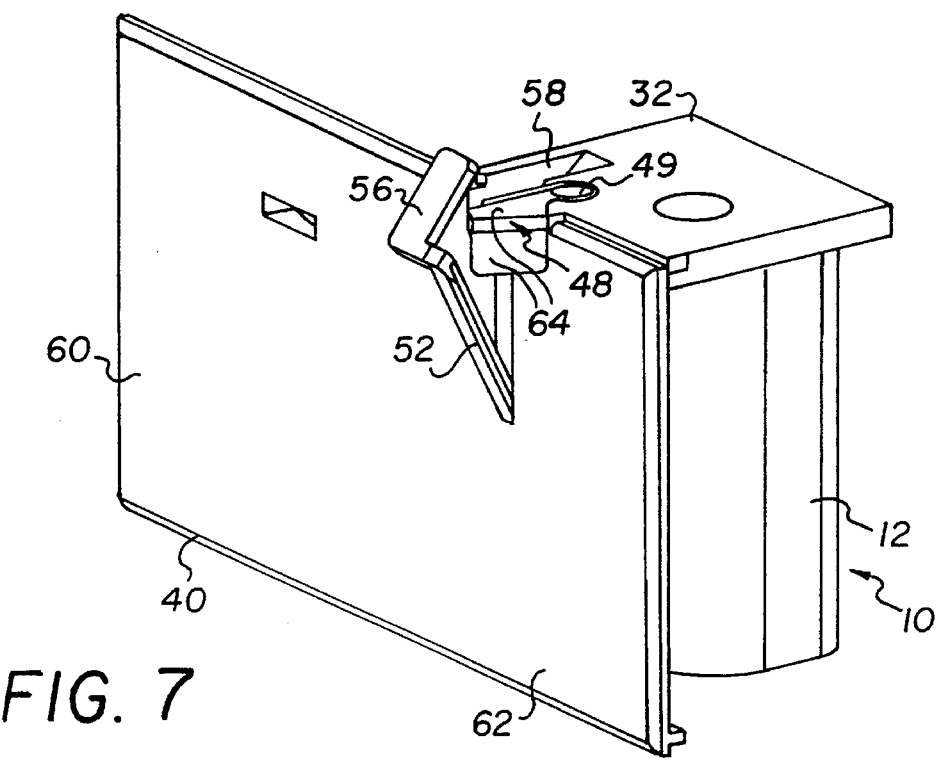
Figure 8:
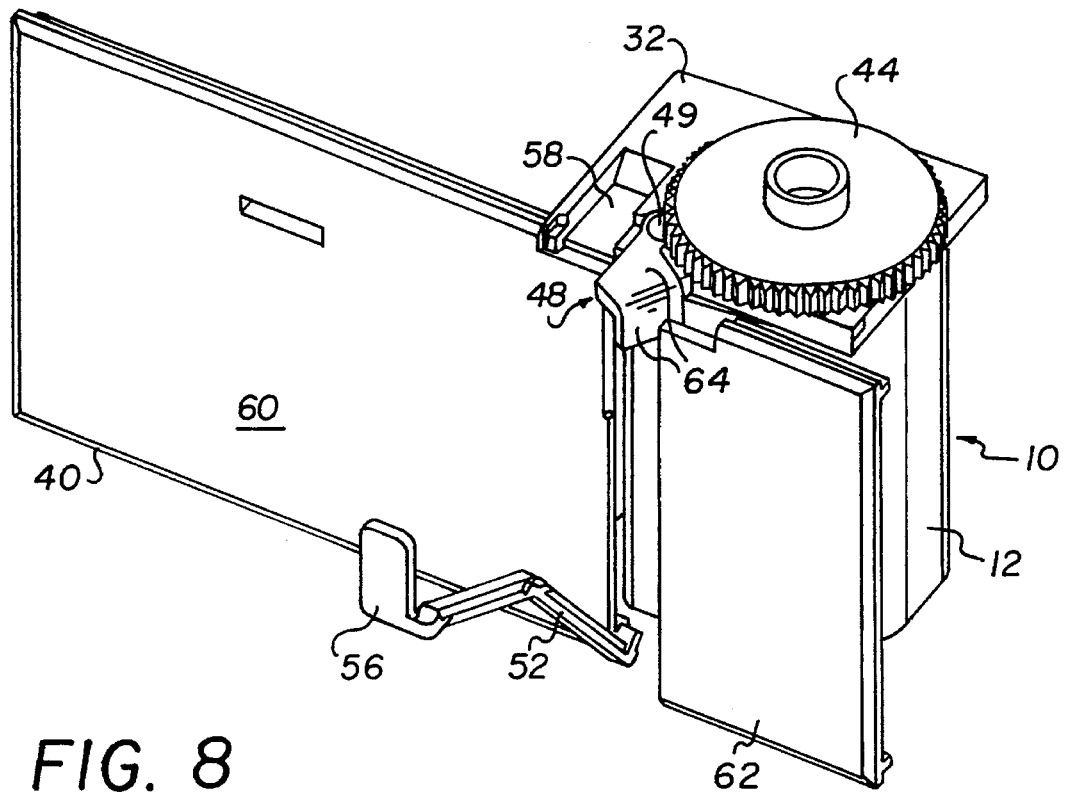

After all of the available sections of the filmstrip have been exposed at the backframe opening 42 and the filmstrip including its film leader is wound completely into the cassette shell 12, the light lock 22 is to be closed and the film cassette 10 is to be removed from the cassette-receiving chamber 34. In this connection, there is provided a tear away strip 52 defined by a pair of parallel grooves 54 or weakened areas along the inside of the rear cover part 40 in the vicinity of the cassette-receiving chamber 34. See FIGS. 1 and 2. The tear away strip 52 has an integral pull tab 56 located in an exterior cavity 58 at the top of the main body part 32, which can be manually grasped to pull the tear away strip away from the rear cover part 40 in order to divide the rear cover part into a large rear cover portion 60 and a small rear cover portion 62 as shown in FIG. 8. The small rear cover portion 62 is located behind the cassette-receiving chamber 34. A shield 64 of the closing lever 48 extends over the exterior cavity 58 to partially cover the pull tab 56, when the light lock 22 is open, to prevent the pull tab from being manually grasped to begin to pull the tear away strip 52 away from the rear cover part 40. In operation, the closing lever is manually pivoted counter-clockwise in FIG. 4 to begin to close the light lock 22. During the first 60 degrees of manually pivoting the closing lever 48, the shield 64 continues to partially cover the pull tab 56 to prevent the pull tab from being manually grasped. See FIG. 4. If any section of the filmstrip is protruding from the film egress/ingress slot 28, the light lock 22 is blocked from being completely closed. Consequently, the closing lever 48 cannot be manually pivoted further to remove the shield 64 from over the pull tab 56. If the filmstrip is wound completely into the cassette shell 22, the closing lever 48 can be pivoted further to completely close the light lock 22 and then to remove the shield 64 from over the pull tab 56 as shown in FIG. 5. Thus, the pull tab 56 can be manually grasped to pull the tear away strip 52 away from the rear cover part 40 and divide the rear cover part 40 into the large and small rear cover portions 60 and 62 as shown in FIGS. 6, 7 and 8. Then, the small rear cover portion 62 can be removed from behind the cassette receiving chamber 34 to, in turn, remove the film cassette 10 from the cassette-receiving chamber.

The invention has been described with reference to a preferred embodiment. However, it will be appreciated that variations and modifications can be effected by a person of ordinary skill in the art without departing from the scope of the invention.

| PARTS LIST |
| --- |
| 10. film cassette |
| 12. cassette shell |
| 14. cassette spool |
| 20. cassette end hole |
| 22. cassette light lock |
| 24. light lock shaft |
| 26. cassette end hole |
| 28. film egress/ingress slot |
| 30. one-time-use camera |
| 32. main body part |
| 34. cassette-receiving chamber |
| 36. unexposed film roll chamber |
| 40. rear cover part |
| 42. backframe opening |
| 44. film advance thumbwheel |
| 46. thumbwheel coaxial projection |
| 48. closing lever |
| 49. pivot disc |
| 50. lever coaxial projection |
| 52. tear away strip |
| 54. inside grooves |
| 56. pull tab |
| 58. exterior cavity |
| 60. large rear cover part |
| 62. small rear cover part |
| 64. shield |

I claim:

1. A camera comprising a cassette-receiving chamber for holding a film cassette provided with a light lock which is to be completely closed before removing the cassette from said chamber, closing means movable to completely close the light lock, and opening means for opening the camera to permit the cassette to be removed from said chamber is characterized in that:

said opening means has a pull tab which can be manually grasped to be moved to begin to open the camera; and said closing means has a shield at least partially covering said pull tab to prevent the pull tab from being manually grasped to be moved to begin to open the camera, but is moved to uncover the pull tab sufficiently to permit it to be manually grasped to be moved to begin to open the camera when the closing means is moved to completely close the light lock.

2. A camera as recited in claim 1, wherein said opening means includes a tear away strip integral with said pull tab and adapted to be pulled beginning with the pull tab to tear open the camera.

3. A camera as recited in claim 2, wherein said tear away strip is located in the vicinity of said chamber to permit the chamber to be opened.

4. A camera as recited in claim 1, wherein said closing means is partially concealed to prevent the closing means together with said shield from being removed from the camera in order for the shield to uncover said pull tab.

5. A camera as recited in claim 1, wherein said closing means includes a manually operated closing lever integral with said shield and having a pivot support, and a film winding thumbwheel at least partially covers said pivot support to prevent said closing lever together with the shield from being removed from the camera in order for the shield to uncover said pull tab.

6. A camera as recited in claim 1, wherein a housing has a cavity from which said pull tab is to be removed to open the camera, and said shield extends over said cavity to at least partially cover said pull tab and removed from over the cavity to uncover the pull tab.

* * * * *